US 3,999,834

United States Patent [19]
Ohtomo et al.

[45] Dec. 28, 1976

[54] METHOD FOR PRODUCING OPTICAL FIBERS AND RESULTING FIBERS

[75] Inventors: Koichiro Ohtomo, Takatsuki; Shizukuni Yata, Settsu, both of Japan

[73] Assignee: Kanebo, Ltd., Tokyo, Japan

[22] Filed: Aug. 13, 1974

[21] Appl. No.: 497,102

[30] Foreign Application Priority Data

Aug. 14, 1973 Japan .............................. 48-91149
Nov. 22, 1973 Japan ............................ 48-131387

[52] U.S. Cl. .................... 350/96 GN; 264/1; 264/129; 350/96 M; 427/44; 427/54; 427/163; 427/164; 427/340; 427/377; 427/385 B; 427/407 R; 427/430 R; 428/378; 428/394

[51] Int. Cl.² ................... G02B 5/14; B29D 11/00; B05D 5/06; B32B 27/02

[58] Field of Search .......... 427/163, 164, 385, 407, 427/430, 44, 54, 340, 377; 350/96 WG, 96 GN, 96 M; 264/1, 129; 428/378, 394

[56] References Cited
UNITED STATES PATENTS

| 3,472,921 | 10/1969 | Fyfe | 264/1 |
| 3,485,556 | 12/1969 | Naujokas | 350/175 GN |
| 3,639,035 | 1/1972 | Irie | 350/96 GN |
| 3,641,332 | 2/1972 | Reich et al. | 350/96 WG |
| 3,785,718 | 1/1974 | Gloge | 350/96 WG |
| 3,801,181 | 4/1974 | Kitono et al. | 350/96 WG |
| 3,816,160 | 6/1974 | Moore | 350/175 GN |
| 3,819,782 | 6/1974 | Irie | 264/1 |
| 3,823,997 | 7/1974 | Gloge | 350/175 GN |

FOREIGN PATENTS OR APPLICATIONS 1,037,498 7/1966 United Kingdom ............. 350/96 R

OTHER PUBLICATIONS

"Light-Focusing Plastic Rod..." in Applied Physics Letters, vol. 23(5), pp. 247–248, 1973.

*Primary Examiner*—William H. Schmidt
*Attorney, Agent, or Firm*—Woodhams, Blanchard and Flynn

[57] ABSTRACT

Light-focussing type optical fibers are formed from concentric circular sheath-core composite fibers composed of a sheath forming polymer having a defined solubility parameter and a defined swelling parameter, which can protect the core, and a core polymer wherein a specific monomer is introduced through the sheath into the core polymer, after which said monomer is polymerized, whereby the defined variation of refractive index from the center of the core towards the periphery of the core is formed.

13 Claims, No Drawings

METHOD FOR PRODUCING OPTICAL FIBERS AND RESULTING FIBERS

The present invention relates to a method for producing optical fibers and more particularly to a method for producing plastic optical fibers having a high variation of refractive index in the cross-sectional direction of the fibers. A large number of plastic optical fibers having various more excellent properties of refractive index and processability than glass optical fibers have heretofore been studied and developed. Particularly, clad type optical fibers (for example Crofon made by Du Pont Co.) have recently been utilized in the light guide field. The light-focussing type optical fibers are small in the energy loss in the transmitted light and maintain the phase of the transmitted light and in some cases can be used as a lens, so that the development of use has been required. For example, as one process for producing light-focussing type plastic optical fibers, a process wherein a solution of methyl methacrylate in a solvent is introduced into fibrous polystyrene as a monomer and then the thus treated fibers are subjected to an irradiation polymerization, has been proposed but it is difficult to introduce methyl methacrylate into polystyrene in a low concentration at a low temperature, so that the introduction must be effected in a high concentration at a high temperature. However, the fibrous polystyrene is dissolved in a high concentration at a high temperature. Accordingly, it is necessary to adopt a low concentration at a low temperature. As the result, the variation of the refractive index in the resulting fiber is small and is only 0.001–0.01. Thus, practically useful plastic light-focussing type optical fibers have never been produced.

The inventors have diligently investigated the above described drawbacks and accomplished the present invention.

An object of the present invention is to provide a method for producing light-focussing type optical fibers having a large variation of the refractive index in the cross-sectional direction of the fibers.

The present invention is characterized in that concentric circular sheath-core composite fibers composed of at least one of polystyrene, polymethyl methacrylate, polycarbonate and styrene-methyl methacrylate copolymer as a core component and a film forming polymer having a solubility parameter of less than 20% and a swelling parameter of 10–50% as a sheath component in a cross-sectional area ratio of the core/sheath being 50/50–95/5, are produced and then a monomer in which the refractive index in the polymer form is lower by at least 0.01 than that of the above described core component and the photo transmission coefficient in the polymer form is up to 5, is introduced into the core component and then the monomer is polymerized.

As the core component to be used in the present invention, use may be made of polymers having a refractive index of more than 1.45 and a photo transmission coefficient of less than 5 and particularly mention may be made of polystyrene, polymethyl methacrylate, polycarbonate and styrene-methyl methacrylate copolymer. A preferable polymer is polystyrene and the most preferable polymer is styrene-methyl methacrylate copolymer. However, these polymers must have a polymerization degree so that they are capable of being melt spun.

An explanation will be made with respect to the photo transmission coefficient hereinafter. The resin to be measured is spun into a fiber having a diameter of 500 $\mu$. The fibers to determine the photo transmission coefficient are carefully cut into various lengths of 0.5–5.0 m by a razor and the photo transmission coefficient of each cut fiber is measured. In the measurement, a usual tungsten bulb having a color temperature of 2,300° K is used. One end of the above cut fiber is brought into focus of the light and the intensity of transmitted light is measured by a phototransistor. The measurement is effected with respect to the respective length and the photo transmission coefficient $\alpha$ is determined from the gradient of the logarithm graph of intensity-length of the following formula (1).

$$T = A\exp(-\alpha x) \tag{1}$$

$T$: intensity of transmitted light
$A$: edge-surface constant
$x$: length ($m$).

The present invention aims at the production of the optical fibers having a large variation of refractive index in the cross-sectional direction of the fibers, so that a fairly severe condition is required in the step for introducing the monomer into the core component as mentioned hereinafter. Particularly, in order to give a large variation of refractive index in the cross-sectional direction of the fiber to the core component, it is necessary to introduce the monomer into the core component in a short time. In general, the core component is dissolved off upon the introduction of the monomer under such a severe condition and the production is difficult. The present invention is to provide a method for producing practically useful optical fibers by introducing the monomer under such a severe condition by protecting the core component with the sheath component. Naturally, the sheath component must have the film-forming ability and further act as the protective film for the monomer upon the introduction of the monomer into the core component and also act as a film for penetrating the monomer in order to promote the introduction of the monomer smoothly. Accordingly, the sheath component to be applied to the present invention must be a film-forming resin which has a solubility parameter of less than 20%, preferably less than 10%, more particularly less than 5% and a swelling parameter of 10–50%, preferably 15–30%. When the solubility parameter exceeds 20%, the sheath component itself is dissolved in the monomer and does not serve to act as the protective film of the core component. When the swelling parameter is less than 10%, the introduction of the monomer into the core component cannot be promoted smoothly. Furthermore, when the swelling parameter exceeds 50%, the introduction of the monomer becomes easy but the retention of the structure is difficult and the final product is deteriorated in the optical property and such a value is not desirable.

The resins that satisfy the above described requirements are determined depending upon the monomer, but for example, for acrylic acid series monomers, polyamides, polyesters and polyolefins, such as polyethylene, polypropylene and the like are preferable. Particularly, among polyamides, nylon is most preferable in view of the adhesion. For fluorine-containing monomers, polyolefins, such as polyethylene, polypropylene and the like are preferable.

Furthermore, as the sheath components, mention may be made of copolymers of styrene with a vinyl compound having at least one function group selected from a haloalkyl group, an amino group and a glycidyl group. The above described vinyl compounds include, for example, chloromethylstyrene, chloroethylstyrene, p-aminostyrene, glycidyl methacrylate and the like. Chloromethylstyrene and glycidyl methacrylate are particularly preferable. The above described copolymerization reaction can be effected by a radical polymerization, ionic polymerization, irradiation polymerization and the like, which have been usually effected. The polymerization ratio of styrene and the above described comonomer is preferred to be 98/2–50/50 mol%. In the cross-linking reaction mentioned hereinafter, the functional group containing monomers must be present in an amount of at least 2 mol% and when the amount exceeds 50 mol%, the polymerization reaction proceeds with difficulty and the spinning becomes difficult. In this case, after the spinning the sheath component must be cross-linked. The cross-linking agents to be used are determined by the functional group contained in the sheath component. For example, for haloalkyl group, amino compounds, diol compounds, carboxylic acid compounds, phosphorus compounds and sulfur compounds are used. For amino group, aldehyde compounds represented by formaldehyde, diisocyanate compounds, compounds having at least two haloalkyl groups, such as ethylene dichloride, ethylene dibromide and the like, dicarboxylic acid compounds and dicarboxylic acid dichloride compounds are used. When the glycidyl group is the functional group, amino compounds, diol compounds and carboxylic acid compounds are preferable. Specific examples of the above described cross-linking agents are diamine compounds, such as ethylenediamine, and propylenediamine as the amino compounds; polyamine compounds, such as diethylenetriamine, triethyltetramine, polyethyleneimine and the like. As the diol compounds, ethylene glycol and tetramethylene glycol and the like are preferable. As the carboxylic acid compounds, oxalic acid, succinic acid, isophthalic acid and the like are preferable. As the diisocyanate compounds, tolylene diisocyanate and 4,4'diphenylmethane diisocyanate and the like are preferable.

As the cross-linking process according to the present invention, the above described cross-linking agents are dissolved in a solvent in an amount of 1–50% by weight and into the resulting solution are charged the above described composite fibers in a bath ratio of 1:10–1:200 and the temperature is gradually raised from room temperature to 50°–110° C. in 0.1–3 hours and the treatment is continued at 50°–110° C for 0–10 hours.

The thus obtained fibers wherein the sheath component has been completely or partially cured and has been made insoluble and infusible, have a two layer structure in appearance.

Then, an explanation will be made with respect to the solubility parameter and the swelling parameter. The resin is molded into a film having a thickness of 100 $\mu$ by a usual hot press process and then the molded resin is immersed in the monomer liquid to be used in the introduction into the core component at 30° C for 24 hours. This monomer contains a polymerization inhibitor. Then the film is taken out from the monomer liquid and placed between filter papers to wipe the superfluous monomer liquid on the film surfaces and the increase of weight is measured. Thereafter, the monomer is extracted with a solvent for the monomer, for example, alcohols, such as methanol or ethanol or acetone and then the film is dried under a reduced pressure to completely remove the monomer and the decrease of weight is measured. The solubility parameter and the swelling parameter are determined from the following formulae.

$$\text{Solubility parameter} = \frac{W_1 - W_3}{W_1} \times 100$$

$$\text{Swelling parameter} = \frac{W_2 - W_1}{W_1} \times 100$$

$W_1$: original weight of film
$W_2$ the weight after the wiping with the filter papers
$W_3$: weight after drying.

An explanation will be made with respect to the spinning process. The conjugate spinning is effected by a conventional conjugate spinning apparatus. The spinning temperature is generally 150°–280° C, preferably 200°–250° C. In the present invention, the core component and the sheath component should be formed into a concentric circle, so that it is necessary to make the melt viscosity of the core component and the sheath component substantially equal. The area ratio of the core component/the sheath component must be 40/60–95/5, preferably 60/40–90/10, more particularly 70/30–85/15. When the sheath component is less than 5%, the spinning is difficult and further it is impossible to fully protect the core component. When the sheath component exceeds 60%, the ratio of the core component is too small, so that the intensity of transmitted light decreases and such fibers are not as satisfactory as the optical fibers.

Since the above described composite fibers are protected by the sheath with respect to the introduction of the monomer, it is possible to introduce the monomer under a very severe condition. Thus, it is possible to treat the core component with the monomer or a monomer solution in a solvent which can dissolve the core component at a high temperature, so that the monomer can be introduced in a very short time and a large variation of refractive index can be given. An explanation will be made with respect to the method for introducing the monomer into the core component. The composite fibers, the outer portion of which is protected, are immersed in the monomer or a monomer solution in a solvent, if necessary, in the presence of a catalyst at a temperature from room temperature to 100° C for 1 minute to 15 hours, preferably 5 minutes to 5 hours. If the treatment is effected at a high temperature, the monomer can be introduced in a very short time (3–60 minutes), so that the continuous treatment of the fibers can be effected.

The monomers to be used in the present invention must satisfy the following requirements. The refractive index in the polymer form is lower by at least 0.01 than that of the core component and the photo transmission coefficient must be less than 5. The monomers will be concretely exemplified hereinafter. When the core component is polystyrene, methyl acrylate, ethyl acrylate, methyl methacrylate, acrylonitrile, acrylic acid or acrylamide is preferable. When the core component is polymethyl methacrylate, fluorine containing monomers, such as vinyl fluoride, vinylidene fluoride and the like are preferable, when the core component is polycarbonate or styrene-methyl methacrylate copolymer, methyl acrylate, ethyl acrylate, methyl methacrylate, acrylonitrile, acrylic acid, acrylamide and the like are preferable.

Furthermore, considering the compatibility of the polymer with the monomer, the monomer to be introduced into styrene-methyl methacrylate copolymer is preferred to be an acrylate monomer, more particularly methyl acrylate. The solvents to be used for the monomers are alcohols, such as methanol, ethanol, propanol and the like; ketones, such as acetone, methyl ethyl ketone and the like; ethers, such as dioxane, tetrahydrofuran and the like; aromatic solvents, such as benzene, toluene, xylene and the like; polar solvents, such as dimethylacetamide, dimethylformamide, nitrobenzene, N-methylpyrrolidone and the like. The concentration of the monomer to be used herein is about 3-100%.

The monomer introduced in the composite fibers may be polymerized by various processes. For example, an irradiation polymerization can be effected. Alternatively, a radical forming catalyst, such as azobisisobutyronitrile or benzoyl peroxide has been previously added the the fibers are heated at a temperature of 60°-80° C for 1-10 hours to effect polymerization. In this case, the fibers may be continuously passed through under a heated atmosphere. In addition, as the other polymerization process, ultraviolet-rays may be used by means of a high pressure mercury lamp or carbon arc.

In the optical fibers wherein the introduced monomer has been polymerized, the refractive index varies from the center of the core towards the outer portion of the core and said index in the center is higher than said index in the outer portion, that is, the variation of the refractive index in the core of the composite fibers has a gradient. The variation of refractive index must be at least 0.005, preferably at least 0.01. When the variation is less than 0.005, the aperture angle is small and consequently, the ability of photo condensation is lower. Accordingly, such fibers are not suitable for the optical fibers.

The thus obtained optical fibers, the outer portion of which is protected, can be applied to the field where the plastic optical fibers have heretofore never been used. For example, the outer protective layer of said optical fibers has a solvent resistance against proper chemicals, so that they can be used in a new field. Furthermore, since the variation of refractive index is large, the aperture angle is large and the intensity of transmitted light is high. Accordingly, it is not necessary to use a lamp having a high directionability, which has heretofore used.

The variation of refractive index of the center and the outer portion of the conventional light-focussing type optical fibers is only 0.001-0.01, while the optical fibers according to the present invention is 0.01-0.1, so that the aperture angle becomes larger and the ability of photo condensation is improved. That is, such a large variation provides about 10 times higher ability of photo condensation and even when the same light source is used, the intensity of transmitted light is high. When the aperture angle is small, a light source having a high directionability (usually laser is used) must be used, while in the optical fibers of the present invention, a relatively low directional lamp may be used as the light source. Consequently the apparatus may be simplified.

In the following Examples, the variation of refractive index in the cross-sectional direction of the optical fibers of the present invention was measured by means of INTERPHAKO type interference microscope made by CARL ZEISS JENA Inc.

The following examples are given for the purpose of illustration of this invention and are not intended as limitations thereof.

EXAMPLE 1

Polyethylene (Trademark FLO-THENE UF-200, made by Seitetsu Kagaku Co.) was used as a sheath component, and polystyrene ($\eta_{rel}$=1.2 in benzene) was used as a core component. Chips of the polymers were supplied to a spinning apparatus for sheath-core composite fiber to prepare a sheath-core optical fiber, which was taken up on a bobbin. Microscopical observation of the cross-section of the fiber showed that the fiber was a substantially complete concentric circle type composite fiber having a diameter of 400 μ and a conjugate ratio of core/sheath of 75/25 (area ratio).

Then, the fiber was immersed in a methanol solution composed of 30 parts by weight of methanol and 70 parts by weight of a mixture of 100 parts by weight of methyl methacrylate and 3 parts by weight of azobisisobutyronitrile in a bath ratio of 1:50 at 50° C for 60 minutes to introduce the methyl methacrylate monomer into the fiber. After the treatment, the fiber was taken out from the methanol solution and treated at 60° C for 6 hours under nitrogen atmosphere to polymerize the introduced monomer.

The above used polyethylene was hot pressed to a thickness of about 100 μ, and immersed in methyl methacrylate added with 1% by weight based on the amount of the methyl methacrylate of hydroquinone as a polymerization inhibitor at 30° C for 24 hours, and the solubility parameter and swelling parameter of the polyethylene were measured according to the method described hereinbefore in the specification. In this measurement, methanol was used as a solvent for the monomer. It was found that the polyethylene had a solubility parameter of 7% and a swelling parameter of 10%.

The above treated fiber was observed with an interference microscope, and it was ascertained that the fiber had a variation of refractive index of 0.020 in the direction of the cross-section and a transmission coefficient of 1.2.

As a comparative fiber, the above described polyethylene ($\eta_{rel}$=1.2 in benzene) was spun alone to prepare a fiber having a diameter of 250 μ. When the fiber was immersed in the same methanol solution containing 70% by weight of the mixture of methyl methacrylate and azobisisobutyronitrile as used in the introduction of the monomer, the fiber was easily dissolved in the solution.

EXAMPLE 2

Polycarbonate (Trademark Polycarbonate A2200, made by Idemizu Sekiyu Kagaku Co.) was used as a core component, and nylon-6 having a relative viscosity $\eta_{rel}$ of 2.15 at 0.5% concentration in 95% sulfuric acid was used as a sheath component. Chips of these polymers were supplied to a spinning apparatus for sheath-core composite fiber, and the extruding rate of the core component or sheath component was varied to produce sheath-core composite fibers having various conjugate ratios of core/sheath as shown in the following Table 1. The conjugate ratio was determined by the area ratio of the core component to the sheath component at the cross-section of the fiber measured by a microscope. It was further found from the microscopic observation that the fibers were substantially concentric circle type composite fibers having a diameter of about 300 μ.

The above obtained composite fiber having the protecting sheath was treated with a methanol solution composed of 20 parts by weight of methanol, 80 parts by weight of methyl acrylate and 1 part by weight of benzoyl peroxide at 55° C for 70 minutes in a bath ratio of 1:50 to introduce the methyl acrylate monomer into the fiber. After the treatment, the fiber was taken out from the solution and heat treated at 70° C for 15 hours under nitrogen atmosphere to polymerize the introduced monomer.

The solubility parameter and swelling parameter of the above used nylon-6 were measured by immersing the nylon-6 in methyl acrylate added with 1% by weight based on the amount of the methyl acrylate of hydroquinone and by using methanol as a solvent for the monomer, and it was found that the nylon-6 had a solubility parameter of 2% and a swelling parameter of 15%.

As a comparative fiber, the same polycarbonate as used above was spun alone, and the resulting fiber was treated under the same condition as described above. However, the fiber was dissolved at the introduction of the monomer. Therefore, the fiber was treated with a solution having a composition of methanol/water/monomer of 40/40/20 (weight ratio) at 25° C for 30 hours to prepare a comparative fiber. The resulting comparative fiber was also subjected to a polymerization reaction under the same condition as described above.

The following Table 1 shows the variation of refractive index and the transmission coefficient of the above obtained fibers together with the conjugate ratio.

Table 1

| Fiber | Conjugate ratio (area ratio) core/sheath | Variation of refractive index | Transmission coefficient |
| --- | --- | --- | --- |
| Outside the present invention | 97/3 | — | — |
| Present invention | 91/9 | 0.021 | 1.5 |
| Present invention | 80/20 | 0.019 | 0.8 |
| Present invention | 65/35 | 0.017 | 1.0 |
| Outside the present invention | 48/52 | 0.013 | 1.9 |

Table 1-continued

| Fiber | Conjugate ratio (area ratio) core/sheath | Variation of refractive index | Transmission coefficient |
| --- | --- | --- | --- |
| Outside the present invention | 35/65 | 0.008 | 5.3 |
| Comparative | 100/0 | 0.002 | 8.9 |

The fiber having a conjugate ratio of core/sheath of 97/3 shown in the above Table 1 was significantly swelled at the introduction of the monomer, and lost somewhat its filamentary shape. Therefore, it was impossible to measure the variation of refractive index and the transmission coefficient of the fiber.

EXAMPLE 3

Polymethyl methacrylate (Trademark DIANAL$^R$ BR-83, made by Mitsubishi Rayon Co.) was used as a core component, and the same polyethylene as used in Example 1 was used as a sheath component, and these polymers were conjugate spun in the same manner as described in Example 1 to obtain a concentric circle type composite fiber having a diameter of 550 μ and a conjugate ratio of core/sheath of 83/17 (area ratio).

The resulting fiber having the protecting sheath was treated with an acetone solution containing 50% by weight of a monomer as shown in the following Table 2 at 50° C for 60 minutes to introduce the monomer into the fiber. For comparison, the same treatment was repeated, except that the fiber was treated for 0.5 minute. After the treatment, the fiber was taken out from the acetone solution, and irradiated with $Co^{60}$ γ-ray for 20 hours at a rate of $0.7\times10^5$ r/hr to polymerize the introduced monomer.

While, when it was tried to introduce the monomer into a polymethyl methacrylate single component fiber, the fiber was dissolved in any of the above described monomers. Therefore, the fiber was treated with a solution having a composition of acetone/water/monomer of 40/40/20 (weight ratio) at 25° C for 40 hours to prepare a comparative fiber. The comparative fiber was also subjected to an irradiation polymerization under the same condition as described above.

Table 2 shows the variation of refractive index and the transmission coefficient of the above obtained fibers together with the kind of introduced monomers and the treating time in the introduction of the monomers.

Table 2

| Fiber | Monomer | Treating time in the introduction of monomer (min.) | Variation of refractive index | Transmission coefficient |
| --- | --- | --- | --- | --- |
| Present invention | Vinyl fluoride | 60 | 0.020 | 0.9 |
| Outside the present invention | Vinyl fluoride | 0.5 | 0.003 | 6.2 |
| Present invention | Vinylidene fluoride | 60 | 0.021 | 0.9 |
| Outside the present invention | Vinylidene fluoride | 0.5 | 0.002 | 0.5 |
| Comparative | Vinyl fluoride | — | 0.002 | 9.8 |

EXAMPLE 4

A mixture of 50 parts by weight of styrene, 50 parts by weight of methyl methacrylate and 1 part by weight of benzoyl peroxide was subjected to a polymerization reaction at 60° C for 30 hours under nitrogen atmosphere. The resulting copolymer was used as a core component, and each of polyethylene, nylon-12, nylon-6, polymethyl acrylate and polypropylene was used as a sheath component, and five kinds of composite fibers were spun. Microscopic observation showed that all the fibers were concentric circle type composite fibers having a conjugate ratio of core/sheath of 75/25 (area ratio).

Then, the resulting fiber was immersed in a butanol solution composed of 40 parts by weight of butanol and 60 parts by weight of a mixture of 100 parts by weight of methyl methacrylate and 3 parts by weight of benzophenone at 90° C for 5 minutes to introduce the methyl methacrylate monomer into the fiber. After the treatment, the fiber was taken out from the solution, and irradiated with carbon arc ultraviolet-ray at 60° C for 60 minutes in air to polymerize the introduced monomer.

The solubility parameter and swelling parameter of the above used sheath-component polymers were measured in the same manner as described in Example 1.

The following Table 3 shows the variation of refractive index and the transmission coefficient of the above obtained composite fibers together with the solubility parameter and swelling parameter of the sheath component polymers.

Table 3

| Sheath component polymer | Swelling parameter (%) | Solubility parameter (%) | Variation of refractive index | Transmission coefficient |
| --- | --- | --- | --- | --- |
| Polyethylene | 10 | 7 | 0.020 | 1.1 |
| Nylon-12 | 14 | 3 | 0.022 | 0.9 |
| Nylon-6 | 15 | 2 | 0.023 | 0.9 |
| Polymethyl acrylate | 85 | 18 | — | 10.5 |
| Polypropylene | 3 | 5 | 0.001 | 9.3 |

EXAMPLE 5

A mixture of 70 parts by weight of styrene, 30 parts by weight of chloromethylstyrene (a mixture of ortho and para isomers) and 2.5 parts by weight of benzoyl peroxide was subjected to a polymerization reaction at 80° C for 12 hours. The resulting mass was melted at 150° C under nitrogen atmosphere, and unreacted monomers were distilled off under a reduced pressure of 5 mmHg. The resulting styrene copolymer had a relative viscosity $\eta_{rel}$ of 0.32 in benzene. The styrene copolymer was formed into chips.

Then, chips of the above obtained chloromethyl group-containing styrene copolymer and chips of polystyrene ($\eta_{rel}$=1.2) were supplied to a spinning apparatus for sheath-core composite fiber to produce a composite fiber having a sheath of the chloromethyl group-containing styrene copolymer, which was taken up on a bobbin. Microscopic observation of the cross-section of the fiber showed that the fiber was a substantially complete concentric circle type composite fiber having a diameter of 350 $\mu$ and a conjugate ratio of core/sheath of 70/30 (area ratio).

The resulting fiber was taken up in the form of a skein, and the sheath component was cured in the following manner. The fiber was immersed in a 30% solution of ethylenediamine in methanol at 20° C in a bath ratio of 1:200, then heated up to 60° C in 2 hours and kept at 60° C for 5 hours to effect the reaction. The thus treated fiber was taken out from the solution, washed with methanol and water repeatedly, and then dried at 60° C under reduced pressure to obtain a fiber having an insoluble and infusible sheath. The fiber was apparently insoluble and infusible as a whole.

Then, the fiber was immersed in a methanol solution composed of 30 parts by weight of methanol and 70 parts by weight of a mixture of 100 parts by weight of methyl methacrylate and 3 parts by weight of azobisisobutyronitrile at 50° C for 1 hour in a bath ratio of 1:50 to introduce the methyl methacrylate monomer into the fiber. After the treatment, the fiber was taken out from the solution and treated at 80° C for 4 hours under nitrogen atmosphere to polymerize the introduced monomer.

The thus treated fiber was sliced, and it was ascertained from the observation of the slice with an interference microscope that the fiber had a variation of refractive index of 0.22 in the direction of the cross-section of the fiber and a transmission coefficient of 1.3. The above used chloromethyl group-containing styrene copolymer was sliced into a film having a thickness of 100 $\mu$, and the solubility parameter and swelling parameter of the styrene copolymer were measured by using methyl methacrylate. It was found that the styrene copolymer had a solubility parameter of 15% and a swelling parameter of 12%.

As a comparative fiber, the above used polystyrene ($\eta_{rel}$=1.2) was spun alone to produce a fiber having a diameter of 250 $\mu$. When the fiber was immersed at 25° C in the same methanol solution containing 70% by weight of the mixture of methyl methacrylate and azobisisobutyronitrile as described above, the fiber was easily dissolved.

EXAMPLE 6

Styrene was added with 15% by weight based on the amount of the styrene of p-aminostyrene, and the resulting mixture was subjected to a pearl polymerization in the presence of 1% by weight based on the amount of the styrene of a potassium persulfate catalyst. The resulting styrene copolymer was melted, defoamed, extruded in the form of a gut, cooled and cut into chips.

Then, polymethyl methacrylate (trademark DIANAL BR-83) was used as a core component, and the above obtained styrene copolymer containing amino groups as a functional group was used as a sheath component, and chips of these polymers were conjugate spun in the same manner as described in Example 1 to obtain a concentric circle type composite fiber having a diameter of 700 $\mu$ and a conjugate ratio of core/sheath of 80/20 (area ratio).

The resulting fiber was taken up in the form of a skein and immersed in a 20% solution of tolylene diisocyanate in DMF in a bath ratio of 1:100 at room temperature, heated up to 60° C in 2 hours and maintained at this temperature for 5 hours to effect a curing of the styrene copolymer. In the thus treated fiber more than 90% of the sheath component was insoluble in benzene, and even when the fiber was heated at 200° C, the filamentary shape was not at all deformed, and therefore the fiber had become completely infusible.

Then the resulting infusible fiber was treated with acetone solutions containing 50% by weight of a monomer as shown in the following Table 4 at 60° C for 40 minutes to introduce the monomer into the fiber. After the treatment, the fiber was irradiated with $Co^{60}$ γ-ray at a rate of $0.7 \times 10^5$ r/hr for 20 hours to polymerize the introduced monomer.

While, when it was tried to introduce the above described monomers into a single component fiber composed of the above described polymethyl methacrylate under the same condition as described above, the fiber was dissolved in any of the monomers. Therefore, the fiber was treated with a solution having a composition of acetone/water/monomer=40/40/20 (weight ratio) at 25° C for 40 hours to prepare a comparative fiber, and the resulting comparative fiber was subjected to an irradiation polymerization under the same condition as described above.

The variation of refraction index and the transmission coefficient of the above obtained fibers were measured, and then the fibers were further heat treated at 80° C for 20 hours, after which the transmission coefficient of the fibers was again measured and the retention of transmission coefficient was calculated.

The obtained results are shown in Table 4.

Table 4

| Fiber | Monomer | Variation of refractive index | Transmission coefficient | Retention of transmission coefficient % |
| --- | --- | --- | --- | --- |
| Present invention | Vinyl fluoride | 0.018 | 0.7 | 95 |
| Present invention | Vinylidene fluoride | 0.016 | 0.9 | 94 |
| Comparative | Vinyl fluoride | 0.002 | 9.8 | 12 |

It can be seen from Table 4 that the fiber of the present invention has a variation of refractive index larger than that of the comparative fiber, and further is superior to the comparative fiber in the transmission coefficient due to the excellent transparency of core portion. Moreover, since the fiber of the present invention has an infusible sheath, the fiber is remarkably excellent in the retention of transmission coefficient after the heat treatment. In the comparative fiber, the filamentary shape is deformed by the heat treatment, and the retention of transmission coefficient is significantly decreased.

EXAMPLE 7

Styrene was added with 15 mol% of glycidyl methacrylate and 1.5 mol% of benzoyl peroxide based on the amount of the styrene, and the resulting mixture was polymerized at 80° C for 6 hours in toluene. The toluene was distilled off under reduced pressure to obtain a solid copolymer, which was dissolved in acetone to prepare a 60% by weight solution of the copolymer in aceton.

Chips of polycarbonate (trademark Polycarbonate A 2200) were supplied to a melt extrusion spinning apparatus of 20 mmφ kept at 250° C to prepare a polycarbonate single component fiber, which was taken up on a bobbin. The polycarbonate fiber was continuously passed through the above prepared acetone solution of the styrene copolymer and coated substantially uniformly with the copolymer. After the resulting fiber was dried at 50° C, the cross-section of the fiber was measured by means of a photograph and it was found that the polycarbonate and the styrene copolymer were bonded in a conjugate ratio of core/sheath of 90/10 (area ratio) to form concentric circles.

Then, the fiber was immersed in a 35% by weight solution of diethylenetriamine in methanol at room temperature, heated up to 60° C in 1 hour, and kept at this temperature for 8 hours, whereby the fiber is made infusible substantially completely.

The resulting infusible fiber was treated with a methanol solution composed of 20 parts by weight of methanol, 80 parts by weight of methyl acrylate and 1 part by weight of benzoyl peroxide at 60° C for 50 minutes in a bath ratio of 1:50 to introduce the methyl acrylate monomer into the fiber. After the treatment, the fiber was taken out from the solution and heat treated at 70° C for 5 hours to polymerization introduced monomer.

The resulting fiber has a variation of refractive index of as high as 0.030 and a very low transmission coefficient of 0.5. Moreover, when the fiber was heat treated at 100° C for 10 hours, the filamentary shape was not at all deformed and the transmission coefficient of the fiber was not varied.

What is claimed is:
1. A method for producing optical fibers having a variation of refractive index in the cross-sectional direction of the fibers, which comprises producing concentric circular sheath-core composite fibers composed of at least one polymer selected from the group consisting of polystyrene, polymethyl methacrylate, polycarbonate and styrene-methyl methacrylate copolymer as the core component and a film-forming polymer having a solubility parameter as defined in the specification of less than 20% and a swelling parameter as defined in the specification of 10–50% as the sheath component, the cross-sectional area ratio of core/sheath being 50/50–95/5, immersing said composite fiber into a solution of a monomer in a solvent, at a temperature of from room temperature to 100° C, for from 1 minute to 15 hours, so that said monomer penetrates through said sheath into said core while said sheath acts as a protective film for said core, said monomer being such that a polymer thereof has a refractive index of at least 0.01 lower than the refractive index of the core and a photo transmission coefficient as defined in the specification of up to 5, and then polymerizing the introduced monomer whereby to transform the core so that its refractive index decreases in a gradient manner from the center of the core to the periphery of the core and the difference between the refractive index at the center of the core and the refractive index at the periphery of the core is at least 0.005.

2. The method as claimed in claim 1, wherein the sheath component is selected from the group consisting of polyamides, polyesters and polyolefins.

3. The method as claimed in claim 1, wherein said sheath component is a copolymer of styrene with a vinyl compound having at least one functional group selected from a haloaklyl group, an amino group and a glycidyl group, said copolymer having been cured with a cross-linking agent.

4. The method as claimed in claim 3, wherein said vinyl compound is chloromethylstyrene or glycidyl methacrylate.

5. The method as claimed in claim 1, wherein said monomer is an acrylic acid series monomer selected from the group consisting of methyl acrylate, ethyl acrylate, methyl methacrylate, acrylonitrile, acrylic acid and acrylamide.

6. The method as claimed in claim 1, wherein said monomer is a fluorine-containing monomer selected from the group consisting of vinyl fluoride and vinylidene fluoride.

7. The method as claimed in claim 1, wherein said core is polystyrene, polycarbonate or styrene-methyl methacrylate copolymer and said monomer is an acrylic acid series monomer.

8. The method as claimed in claim 1, wherein said core is polymethyl methacrylate and said monomer is a fluorine-containing monomer.

9. The method as claimed in claim 1, wherein said solvent for the monomer is an alcohol, a ketone, an ether, an aromatic solvent or a polar solvent.

10. The method as claimed in claim 1, wherein said difference of refractive index in the core portion is from 0.01 to 0.1.

11. An optical fiber prepared by the method of claim 10.

12. The method as claimed in Claim 1 in which said core consists essentially of styrene-methyl methacrylate copolymer, said sheath consists essentially of film-forming nylon, and said monomer is methyl methacrylate.

13. An optical fiber prepared by the method of Claim 1.

* * * * *